United States Patent
Nishio et al.

(10) Patent No.: US 10,437,188 B2
(45) Date of Patent: Oct. 8, 2019

(54) IMAGE FORMING APPARATUS

(71) Applicants: Takuma Nishio, Kanagawa (JP);
Yoshinobu Sakaue, Kanagawa (JP);
Susumu Narita, Tokyo (JP); Ryo Sato, Tokyo (JP); Koichi Murota, Tokyo (JP); Masashi Suzuki, Saitama (JP);
Hiroaki Nishina, Tokyo (JP)

(72) Inventors: Takuma Nishio, Kanagawa (JP);
Yoshinobu Sakaue, Kanagawa (JP);
Susumu Narita, Tokyo (JP); Ryo Sato, Tokyo (JP); Koichi Murota, Tokyo (JP); Masashi Suzuki, Saitama (JP);
Hiroaki Nishina, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/048,567

(22) Filed: Jul. 30, 2018

(65) Prior Publication Data
US 2019/0094776 A1 Mar. 28, 2019

(30) Foreign Application Priority Data
Sep. 25, 2017 (JP) ................. 2017-184079

(51) Int. Cl.
*H04N 1/00* (2006.01)
*G03G 15/22* (2006.01)
(Continued)

(52) U.S. Cl.
CPC ..... *G03G 15/228* (2013.01); *G03G 15/04054* (2013.01); *H04N 1/00702* (2013.01);
(Continued)

(58) Field of Classification Search
CPC ............... H04N 1/6033; H04N 1/6041; H04N 1/00702; H04N 1/00763; H04N 1/00771
See application file for complete search history.

(56) References Cited

U.S. PATENT DOCUMENTS

2011/0228355 A1* 9/2011 Morita ................ G03G 15/043
358/475
2015/0110514 A1* 4/2015 Mori ................. G03G 15/5041
399/74
(Continued)

FOREIGN PATENT DOCUMENTS

JP  11-240202  9/1999
JP  2006-056173  3/2006
(Continued)

*Primary Examiner* — Ted W Barnes
(74) *Attorney, Agent, or Firm* — Harness, Dickey & Pierce, P.L.C.

(57) ABSTRACT

An image forming apparatus includes an image reading device; an image forming device including a photoconductor, a charger, an exposure device including a light-emitting element, a memory to store a first correction value for correction a light emission amount of the light-emitting element, and a driver to drive the light-emitting element, a developing device, a transfer device, and a fixing device. The image forming apparatus further includes a processor to calculate a second correction value for correcting the light emission amount, based on density data of image data of a predetermined pattern on a recording medium; calculate a third correction value for correcting the light emission amount, based on the first correction value and the second correction value; and determine, before calculating the third correction value, whether placement of the recording medium on the reading table is correct based on the density data.

10 Claims, 17 Drawing Sheets

(51) Int. Cl.
*H04N 1/053* (2006.01)
*H04N 1/047* (2006.01)
*G03G 15/04* (2006.01)
*H04N 1/60* (2006.01)

(52) U.S. Cl.
CPC ..... *H04N 1/00763* (2013.01); *H04N 1/00771* (2013.01); *H04N 1/00779* (2013.01); *H04N 1/0473* (2013.01); *H04N 1/053* (2013.01); *H04N 1/6033* (2013.01); *H04N 1/6041* (2013.01); *H04N 1/605* (2013.01)

(56) References Cited

U.S. PATENT DOCUMENTS

| | | | |
|---|---|---|---|
| 2015/0362879 A1* | 12/2015 | Kaneko | G03G 15/556 399/49 |
| 2016/0274521 A1* | 9/2016 | Iwata | G03G 15/5041 |
| 2017/0017177 A1* | 1/2017 | Iwata | G03G 15/043 |
| 2017/0153588 A1* | 6/2017 | Tanaka | G03G 15/5062 |
| 2018/0239271 A1* | 8/2018 | Suzuki | G03G 15/55 |

FOREIGN PATENT DOCUMENTS

| | | |
|---|---|---|
| JP | 2007-118194 | 5/2007 |
| JP | 2015-085525 | 5/2015 |

\* cited by examiner

IMAGE FORMING APPARATUS

CROSS-REFERENCE TO RELATED APPLICATIONS

This patent application is based on and claims priority pursuant to 35 U.S.C. § 119(a) to Japanese Patent Application No. 2017-184079, filed on Sep. 25, 2017, in the Japan Patent Office, the entire disclosure of which is hereby incorporated by reference herein.

BACKGROUND

Technical Field

The present disclosure relates to an image forming apparatus.

Description of the Related Art

In a light emitting diode (LED) head, variations in shape and characteristics of LED elements, minute misalignment in LED chips, or periodic or aperiodic fluctuations in optical characteristics of a lens array cause density unevenness. Such density unevenness occurs as vertical streaks or bands extending perpendicular to the arrangement direction of the LED elements, degrading image quality.

To correct such vertical streaks and vertical bands resulting from the LED head, the following approach is known. A predetermined pattern for density detection is formed with an image forming apparatus for testing an LED head, and the pattern is read with a scanner. Based on the image density of the pattern, correction values for reducing vertical stripes and vertical bands are calculated and recorded in a memory of the LED head to be used in printing.

SUMMARY

According to an embodiment of this disclosure, an image forming apparatus includes an image reading device including a reading table. The image reading device generates image data from reading of a pattern on a recording medium placed on the reading table. The image forming apparatus further includes an image forming device including a photoconductor, a charger to charge a surface of the photoconductor, an exposure device to expose the charged surface of the photoconductor to form an electrostatic latent image on the photoconductor, a developing device to supply toner to the electrostatic latent image to form a toner image, a transfer device to transfer the toner image onto a recording medium, and a fixing device to fix the toner images on the recording medium. The exposure device includes a light-emitting element, a memory to store a first correction value for correcting a light emission amount of the light-emitting element, and a driver to drive the light-emitting element. The image forming apparatus further includes a processor configured to cause the image forming device to form a predetermined pattern on the recording medium and cause the image reading device to generate the image data of the predetermined pattern; calculate a second correction value for correcting the light emission amount, based on density data acquired from the image data of the predetermined pattern; calculate a third correction value for correcting the light emission amount, based on the first correction value and the second correction value; and determine, before calculating the third correction value, whether placement of the recording medium on the reading table is correct based on the density data.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
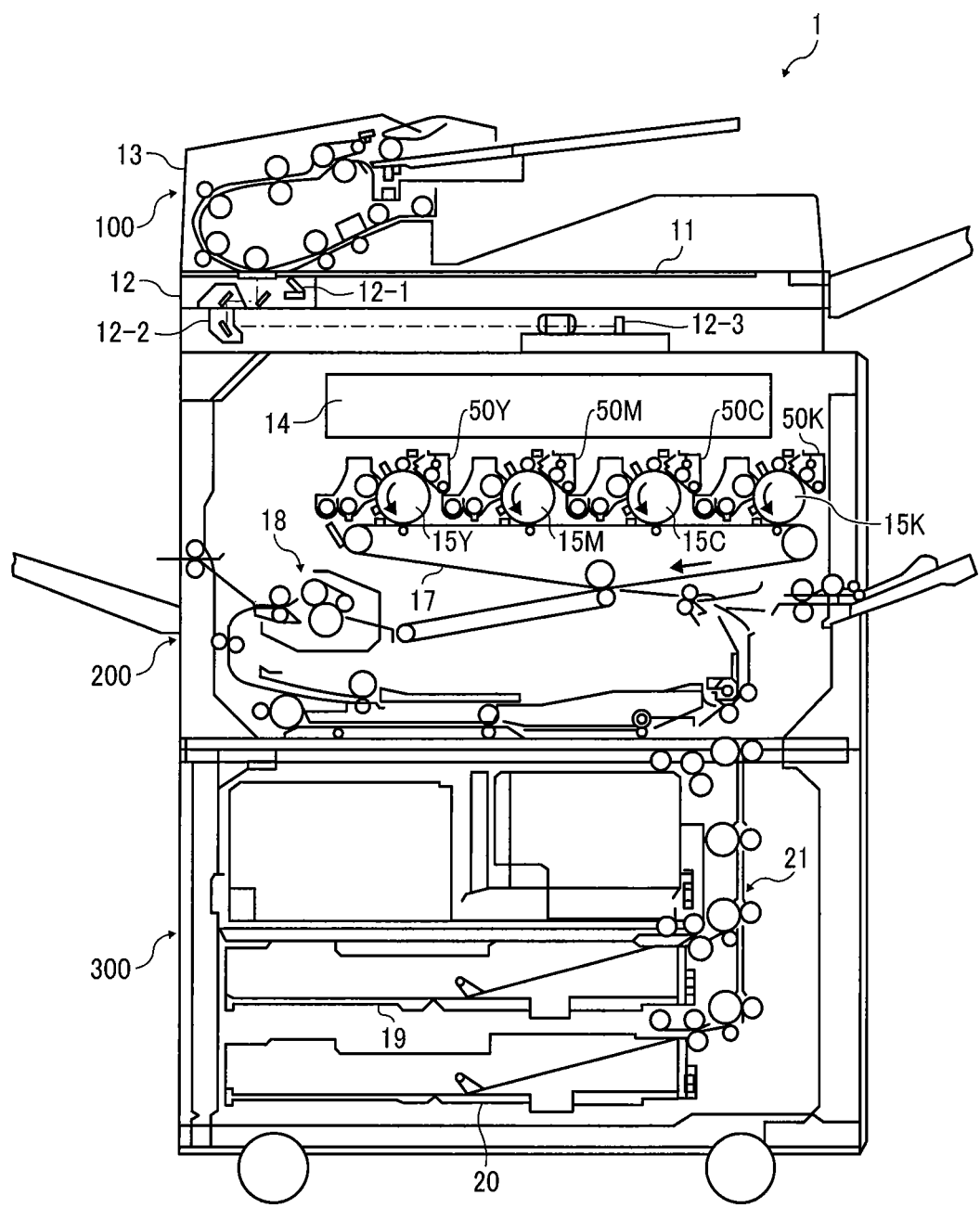
FIG. 1 is a schematic cross-sectional view of an image forming apparatus according to an embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus according to an embodiment of this disclosure is described. As used herein, the singular forms "a", "an", and "the" are intended to include the plural forms as well, unless the context clearly indicates otherwise.

The suffixes Y, M, C, and K attached to each reference numeral indicate only that components indicated thereby are used for forming yellow, magenta, cyan, and black images, respectively, and hereinafter may be omitted when color discrimination is not necessary.

FIG. 1 is a schematic side view of an image forming apparatus 1 incorporating a scanner 100. The image forming apparatus 1 is a multifunction peripheral (MFP) having a plurality of functions such as a copy function, a facsimile (FAX) function, a print function, a scanner function, storing of an input image (an image of a document scanned or an image input by the print function or the facsimile function), and distribution of the input image. The image forming apparatus 1 includes the scanner 100 as an image reading device, an image forming device 200, and a sheet feeder 300.

The scanner 100 includes an exposure glass 11 as a reading table and a reading unit 12. The reading unit 12 includes a light source 12-1, a mirror 12-2, and a sensor 12-3. Light from the light source 12-1 is directed onto a recording medium such as a paper sheet placed on the exposure glass 11. The light reflected on the recording medium is further reflected by the mirror 12-2 toward the sensor 12-3. Based on the light received, the sensor 12-3 generates image data. The scanner 100 can further include an automatic document feeder (ADF) 13. The ADF 13 automatically conveys the recording medium onto the exposure glass 11 with a sheet feeding roller.

The image forming device 200 includes an exposure device 14 and image forming units 50Y, 50M, 50C, and 50K (hereinafter simply "image forming unit 50" when color discrimination is not necessary). The image forming units 50 include photoconductor drums 15Y, 15M, 15C, and 15K (hereinafter simply "photoconductor drum 15" when color discrimination is not necessary).

The exposure device 14 exposes the photoconductor drum 15 to form a latent image, based on image data read from the document by the scanner 100 and a print instruction received from an external device. As will be described later, the image forming units 50 supplies different color toners, respectively, to the photoconductor drums 15 to develop the latent images into toner images. The toner images are then transferred from the photoconductor drums 15 via a transfer belt 17 onto the recording medium fed by the sheet feeder 300, after which a fixing device 18 fuses and fixes the superimposed toner images on the recording medium.

The sheet feeder 300 includes sheet feeding trays 19 and 20 to accommodate different size recording media and a feeder 21 to feed the recording medium from the sheet feeding tray 19 or 20 to an image formation position in the image forming device 200. The feeder 21 includes various types of rollers.

Figure 2:
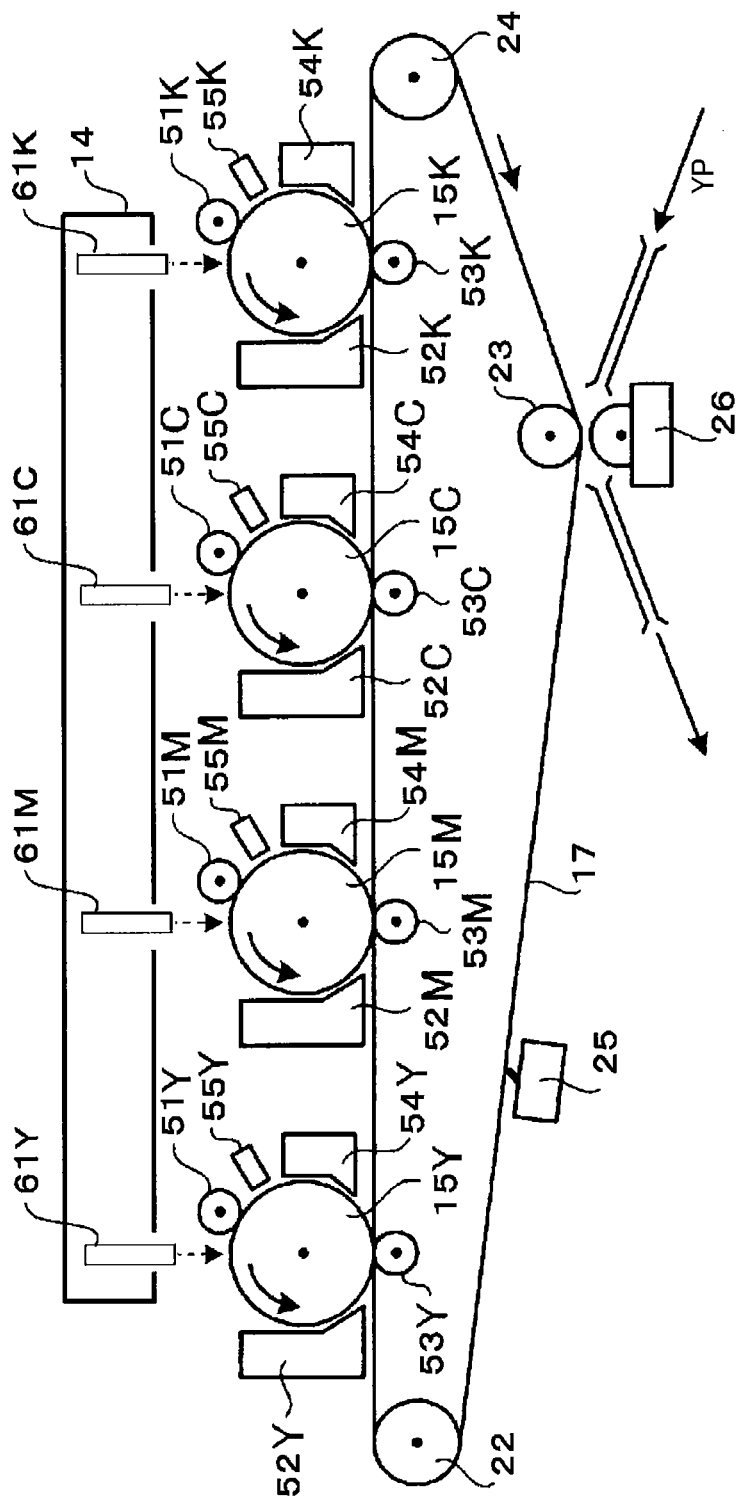
FIG. 2 is a schematic diagram illustrating an example structure of an image forming unit 50 and periphery in the image forming apparatus illustrated in FIG. 1.

FIG. 2 is a schematic diagram illustrating an example structure of the image forming unit 50 and periphery thereof. FIG. 2 is a cross-sectional view of the periphery of the image forming unit 50 viewed from a side. Operations common to the image forming units 50 will be described using the image forming unit 50Y as a representative.

The image forming unit 50Y includes the photoconductor drum 15Y as an image bearer. Further, a charging device 51Y (a charger), a developing device 52Y, a transfer device 53Y, a cleaning device 54Y, and a discharge device 55Y are disposed around the photoconductor drum 15Y. Between the charging device 51Y and the developing device 52Y in the direction of rotation of the photoconductor drum 15Y, a light-emitting diode (LED) array head 61Y of the exposure device 14 is disposed. The LED array head 61Y is a light source. The LED array head 61Y is configured to expose the photoconductor drum 15Y. The LED array head 61Y can be incorporated in the image forming unit 50Y.

To form images, the charging device 51Y uniformly charges the surface of the photoconductor drum 15Y in the dark, after which the LED array head 61Y exposes the surface of the photoconductor drum 15 with light corresponding to a yellow image, thus forming an electrostatic latent image thereon. The developing device 51Y develops (visualizes) the electrostatic latent image with yellow toner. As a result, a yellow toner image is formed on the photoconductor drum 15Y. The yellow toner image is then transferred from the photoconductor drum 15Y onto the transfer belt 17, which is looped around rollers 22, 23 and 24 and rotates clockwise in the drawing.

Similar to the image forming unit 50Y, in the image forming units 50M, 50C, and 50K, the toner images are sequentially transferred from the respective photoconductor drums 15M, 15C, and 15K onto the transfer belt 17. Thus, four color images are superimposed on the transfer belt into a multi-color image. Then, a secondary transfer unit 26 (see FIG. 2) transfers the image from the transfer belt 17 onto the recording medium, which is conveyed to the secondary transfer unit 26 as indicated by arrow YP illustrated in FIG. 2. Then, the four-color superimposed image is formed on the recording medium. Then, in the fixing device 18, the image is fixed on the recording medium with heat and pressure. The recording medium on which the image has been fixed is discharged outside the image forming apparatus 1. After the transferring, a cleaning device 25 removes residual toner remaining untransferred on the transfer belt 17.

Figure 3:
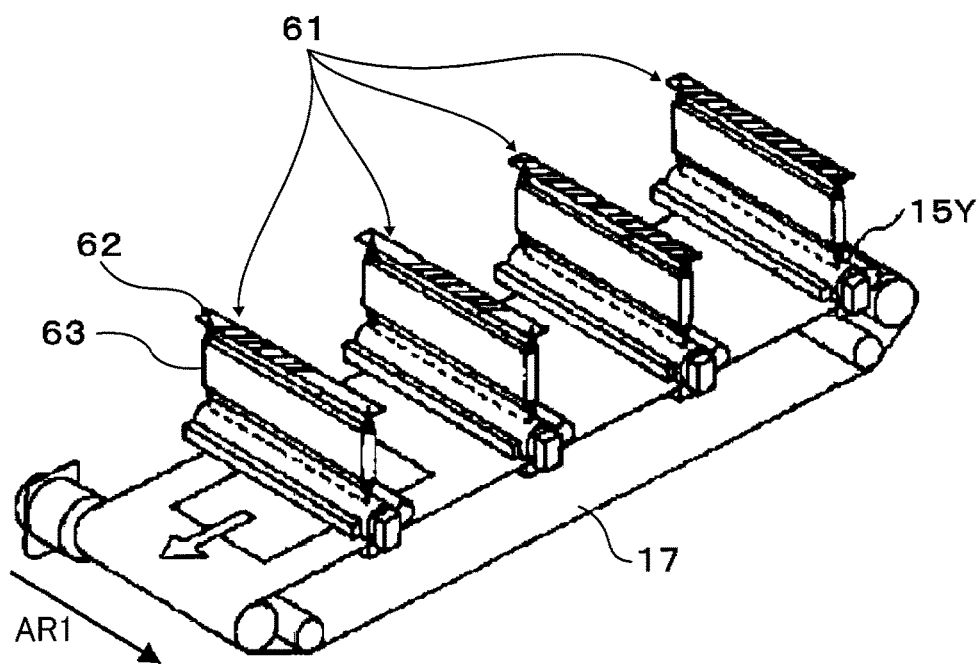
FIG. 3 is a schematic diagram illustrating an example of a detailed configuration of an exposure device according to an embodiment.

FIG. 3 is a perspective view of the LED array head 61 and the periphery thereof. The LED array head 61 is a unit including an LED array 62 and a lens array 63. The LED array 62 includes a substrate and a plurality of LED array elements mounted on the substrate and lined in a main scanning direction (indicated by arrow AR1 in FIG. 3) which is perpendicular to a sub-scanning direction identical to a direction in which the recording medium is conveyed (indicated by hollow arrow in FIG. 3). The main scanning direction is perpendicular to the direction of rotation of the photoconductor drum 15. Each LED element is driven to emit light according to the image data. The light of the LED element is directed to the photoconductor drum 15 through a lens corresponding to each LED element, of the lens array 63 including a plurality of lenses. In the drawing, of the plurality of photoconductor drums 15, only the photoconductor drum 15Y is numbered for simplicity.

Figure 4:
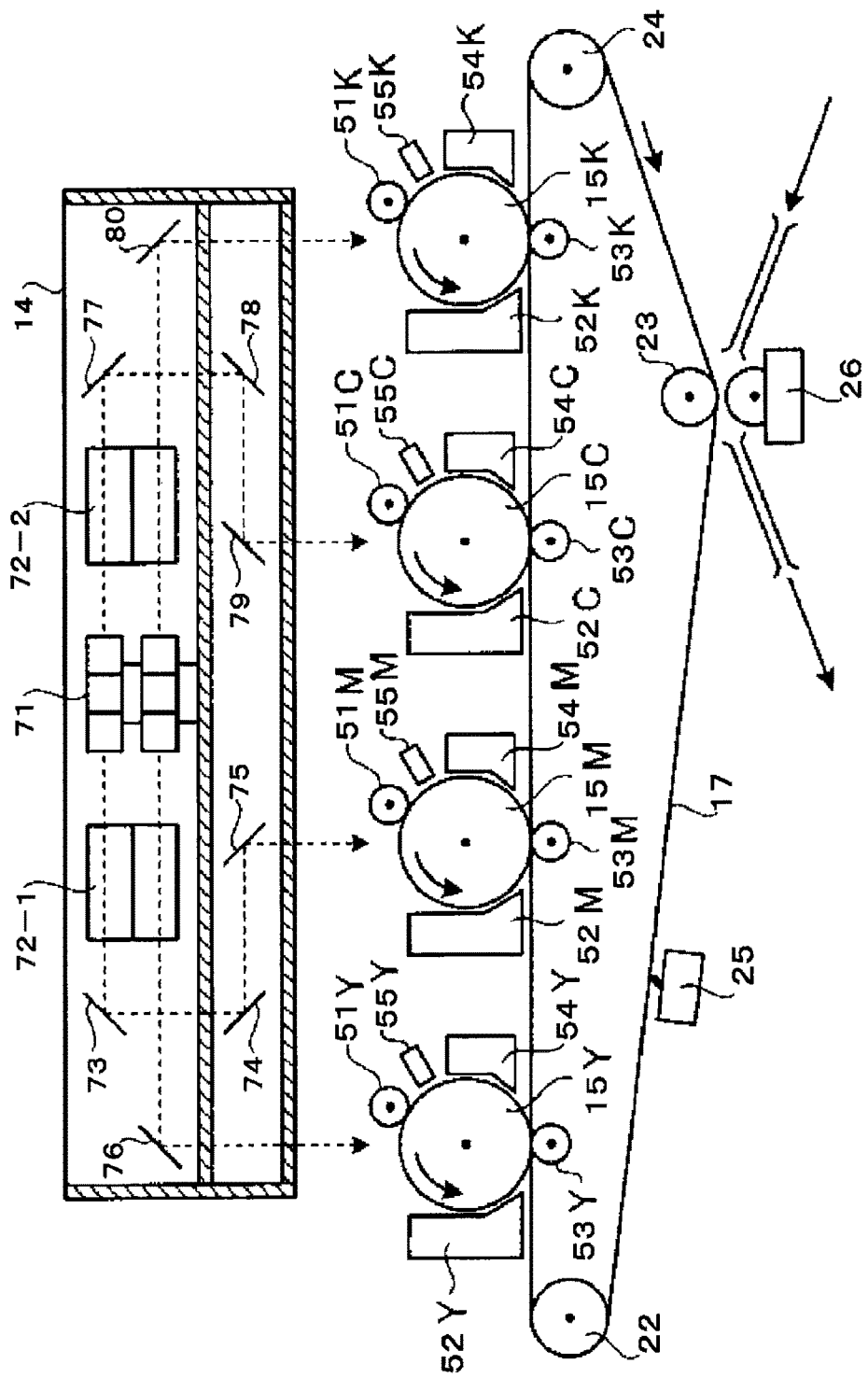
FIG. 4 is a schematic view of another example structure of the image forming unit and the periphery thereof.
Figure 5:
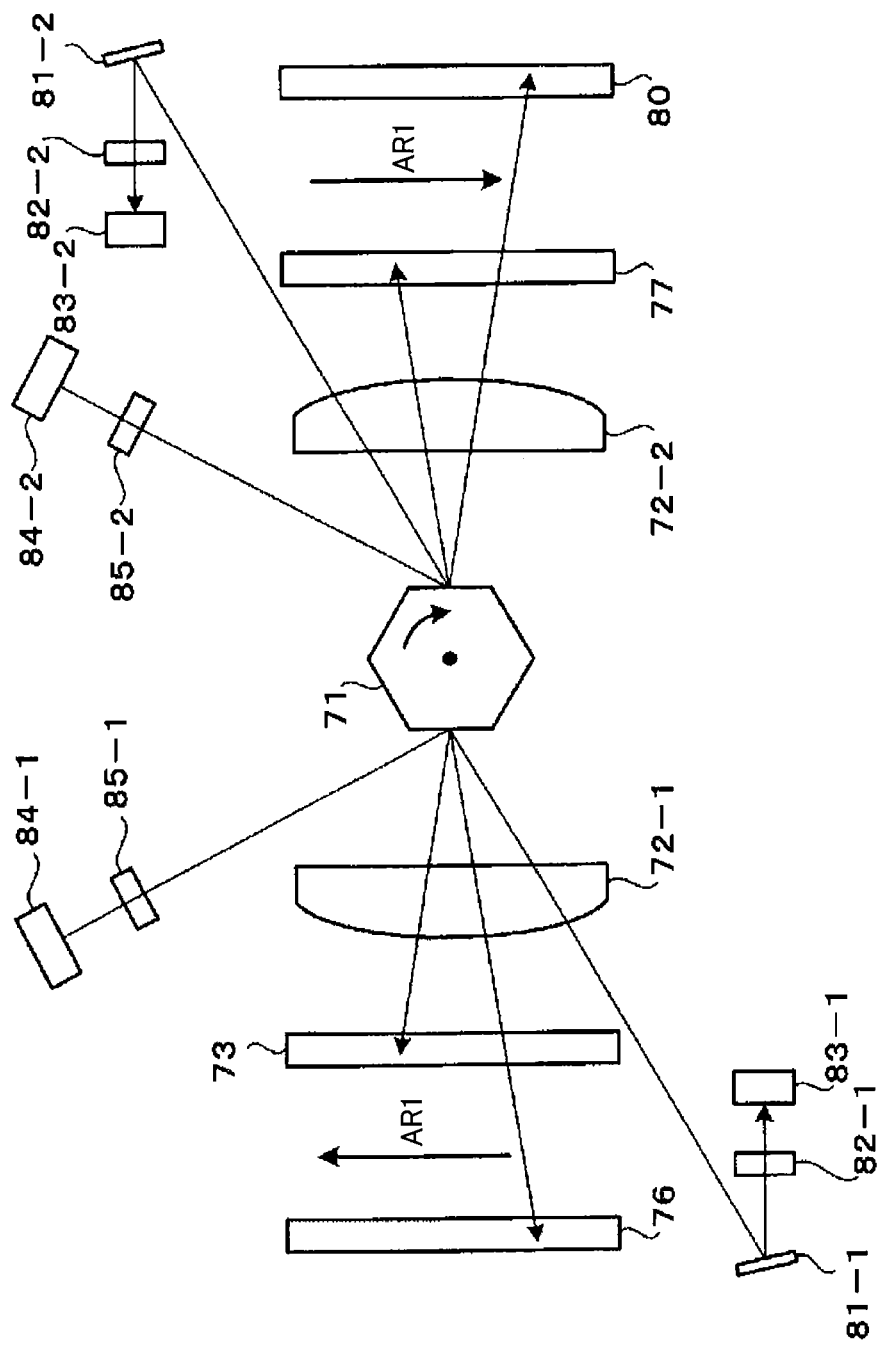
FIG. 5 is a schematic diagram illustrating another example of the detailed configuration of the exposure device.

FIG. 4 is a schematic view of another example structure of the image forming unit 50 and the periphery thereof. The structure illustrated in FIG. 4 is different from that illustrated in FIG. 2 in the configuration of the exposure device 14. FIG. 5 is a schematic diagram illustrating another example of the detailed configuration of the exposure device 14. FIG. 4 is a view of the image forming unit 50 and the peripheral configuration as seen through from a side, and FIG. 5 is a view of the exposure device 14 as seen through from above.

The exposure device 14 uses a polygon mirror 71 to deflect a light beam to scan the photoconductor drum 15 in the main scanning direction. The exposure device 14 deflects different color light beams at a time using upper and lower portions of polygon mirror faces. Further, the exposure device 14 deflects two different color light beams at a time on the opposite sides of the polygon mirror 71 so that four color light beams are directed to the photoconductor drums 15 of respective colors.

The exposure device 14 includes laser diode (LD) units 84-1 and 84-2 as light source units. Each of the LD units 84-1 and 84-2 includes a laser element. According to the image data, the laser element is driven and modulated so that light beam is selectively emitted.

The light beam emitted from the LD unit 84-1 passes through the cylinder lens 85-1 and is directed to the polygon mirror 71 rotated by a polygon motor. The LD unit 84-1 includes LDs respectively disposed in an upper portion and a lower portion thereof. For example, a magenta light beam is emitted from the upper LD and directed to the upper portion face of the polygon mirror 71, and a yellow light beam emitted from the lower LD is directed to the lower portion face of the polygon mirror 71.

The magenta light beam directed to the upper portion face of the polygon mirror 71 is deflected as the polygon mirror 71 rotates. The deflected magenta light beam passes through an f-θ lens 72-1 and is reflected back by mirrors 73 to 75 to scan the photoconductor drum 15M. The yellow light beam directed to the lower portion face of the polygon mirror 71 is deflected as the polygon mirror 71 rotates. The deflected yellow light beam passes through the f-θ lens 72-1 and is reflected back by a mirror 76 to scan the photoconductor drum 15Y.

A synchronous mirror 81-1, a synchronous lens 82-1, and a synchronous sensor 83-1 are disposed in a non-image writing area, which is in an end portion on a writing start side in the main scanning direction, and outward a writing start position in the main scanning direction. The light beams of magenta and yellow transmitted through the f-θ lens 72-1 are reflected by the synchronous mirror 81-1, collected by the synchronous lens 82-1, and directed to the synchronous sensor 83-1. The synchronous sensor 83-1 outputs synchronization detection signals for determining the timing of start of writing in the main scanning direction of respective colors as the magenta and yellow light beams enter the synchronous sensor 83-1.

The light beam emitted from the LD unit 84-2 (i.e., the light source unit) passes through the cylinder lens 85-2 and is directed to the polygon mirror 71 rotated by the polygon motor. An upper portion and a lower portion of the LD unit 84-2 include LDs respectively. For example, a cyan light beam is emitted from the upper LD and directed to the upper portion face of the polygon mirror 71, and a black light beam emitted from the lower LD is directed to the lower portion face of the polygon mirror 71.

The cyan light beam directed to the upper surface of the polygon mirror 71 is deflected by the rotation of the polygon mirror 71. The deflected cyan light beam passes through the f-θ lens 72-2 and is reflected back by the mirrors 77 to 79 to scan the photoconductor drum 15C. The black light beam directed to the lower surface of the polygon mirror 71 is deflected by the rotation of the polygon mirror 71, the deflected light beam of the black color passes through the f-θ lens 72-2 and is reflected back by the mirror 80 to scan the photoconductor drum 15K.

A synchronous mirror 81-2, a synchronous lens 82-2, and a synchronous sensor 83-2 are disposed in a non-image writing area, which is in an end portion on a writing start side in the main scanning direction, and outward a writing start position in the main scanning direction. The cyan and black light beams passing through the f-θ lens 72-2 are reflected by the synchronous mirror 81-2, condensed by the synchronous lens 82-2, and directed to the synchronization sensor 83-2. The synchronous sensor 83-2 outputs synchronization detection signals for determining the timing of start of writing in the main scanning direction of respective colors as the cyan and black light beams enter the synchronous sensor 83-2.

Figure 6:
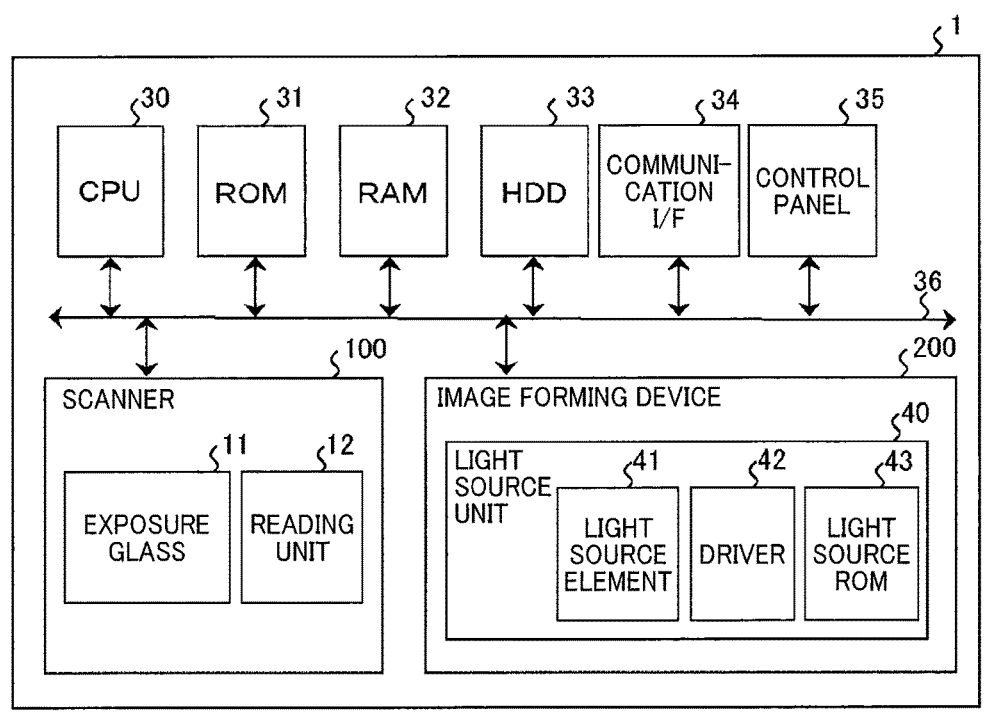
FIG. 6 is a schematic block diagram illustrating a hardware configuration of the image forming apparatus illustrated in FIG. 1.

FIG. 6 is a schematic block diagram illustrating a hardware configuration of the image forming apparatus 1. As illustrated in FIG. 6, the image forming apparatus 1 includes, at least, a central processing unit (CPU) 30, a read only memory (ROM) 31, a random access memory (RAM) 32, a hard disk drive (HDD) 33, a communication interface (I/F) 34, a control panel 35, the scanner 100, and the image forming device 200. These elements are connected with each other via a system bus 36.

The CPU 30 controls operation of the image forming apparatus 1. The CPU 30 executes programs stored in the ROM 31 or the HDD 33, using the RAM 32 as a work area, to control the entire operation of the image forming apparatus 1. Thus, the CPU 30 implements various functions such as copying, scanning, facsimile communication, and printing functions described above. Execution of each of these functions (hereinafter also "job") can be stored, each time, in the HDD 33 as operation logs of the image forming apparatus 1.

The communication I/F 34 is an interface to accept a job from an external device via a network and transmit the image data generated from scanning by the scanner 100 to the outside via the network.

The control panel 35 accepts various inputs corresponding to operation of an operator (or user) and displays various types of information such as information indicating the operation accepted, information indicating the operational status of the image forming apparatus 1, and information indicating the setting of the image forming apparatus 1. In one example, the control panel 35 is, but not limited to, a liquid crystal display (LCD) having a touch panel function. Another example usable is an organic electroluminescence (EL) display having a touch panel function. In alternative to or in addition to the LCD or the EL display, the control panel 35 can include an operation unit such as hardware keys, a display unit such as an indicator lamp, or both.

As described above, the scanner 100 includes the exposure glass 11 and the reading unit 12.

The image forming device 200 includes a light source unit 40. The light source unit 40 corresponds to the LED array head 61 described with reference to FIGS. 2 and 3 and the LD unit 84-1 and the LD unit 84-2 described with reference to FIGS. 4 and 5. The light source unit 40 further includes light source elements 41, a driver 42, and a light source ROM 43 (a memory).

The light source elements 41 corresponds to the LED array element of the LED array head 61 described with reference to FIGS. 2 and 3 and laser elements respectively included in the LD units 84-1 and 84-2 described with reference to FIGS. 5 and 6. The driver 42 is, for example, a driver integrated circuit (IC). The driver 42 drives the light source element 41 to turn on according to the image data. The light source ROM 43 stores information and settings required for the driver 42 to drive the light source elements 41.

Figure 7:
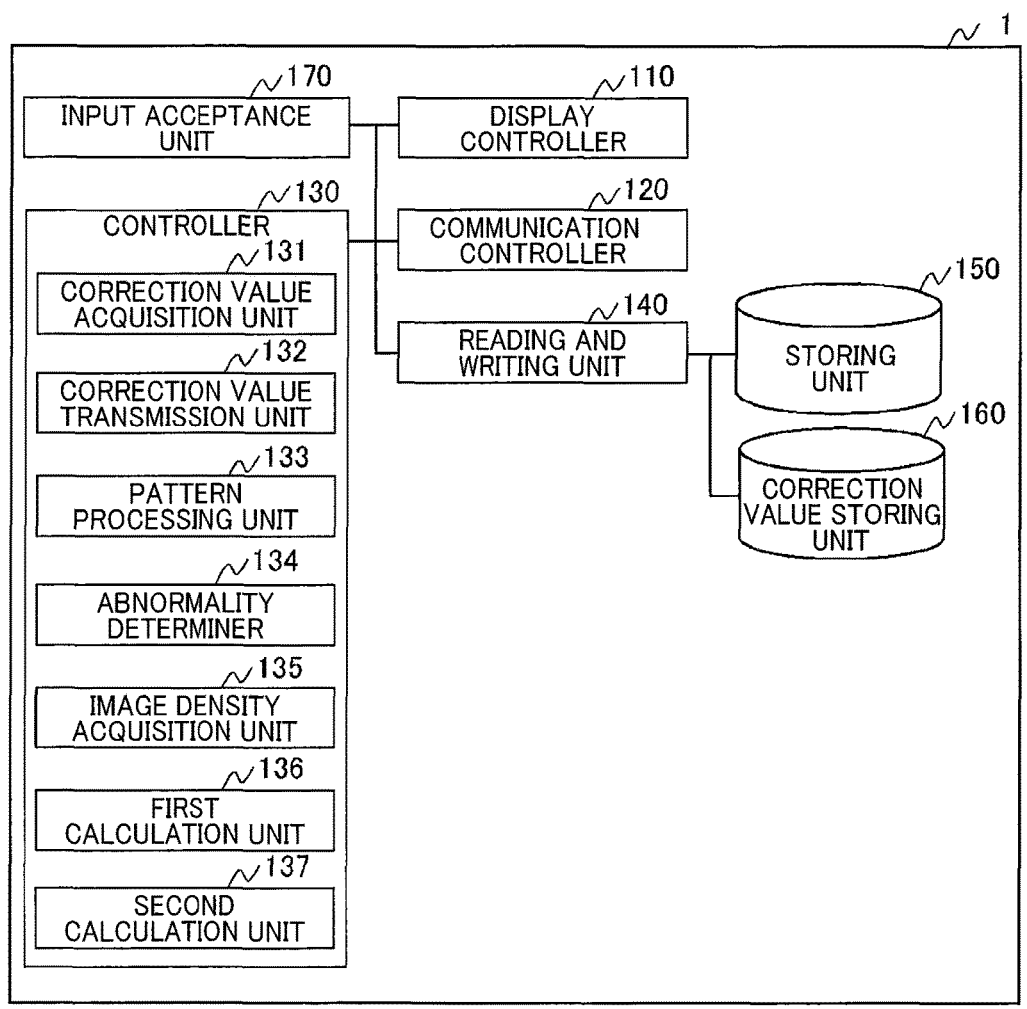
FIG. 7 is a functional block diagram of the image forming apparatus illustrated in FIG. 1.

FIG. 7 is a block functional diagram of the image forming apparatus 1. The image forming apparatus 1 includes a display controller 110, a communications controller 120, a controller 130 (a processor), a reading and writing unit 140, a storing unit 150, a correction value storing unit 160; and an input acceptance unit 170.

The display controller 110 is implemented by the CPU 30 executing a program stored in the ROM 31 or the HDD 33, using the RAM 32 as the work area, and controls a display screen on the input acceptance unit 170.

The communication controller 120 is implemented by the processing of the communication I/F 34. To email the image data to the outside or accept various types of setting information from an external device, the communication controller 120 communicates with the external device via a network.

The controller 130 is implemented by the CPU 30 executing a program stored in the ROM 31 or the HDD 33 using the RAM 32 as a work area, and executes copying, scanning, printing, or a facsimile function, as one example of the function of the entire image forming apparatus 1. The controller 130 includes a correction value acquisition unit 131, a correction value transmission unit 132, a pattern processing unit 133, an abnormality determiner 134, an image density acquisition unit 135, a first calculation unit 136, and a second calculation unit 137. Details of the controller 130 will be described later in a processing flow.

The reading and writing unit 140 is implemented by the CPU 30 executing a program stored in the ROM 31 or the HDD 33 using the RAM 32 as a work area. The reading and writing unit 140 stores various types of data in the storing unit 150 or the correction value storing unit 160 and retrieves the data stored therein.

The storing unit 150 is implemented by the ROM 31 or the HDD 33, to store programs, document data, various setting information necessary for the operation of the image forming apparatus 1, operation logs of the image forming apparatus 1, and the like. Alternatively, the storing unit 150 can be implemented by a temporary storage function of the RAM 32.

The correction value storing unit 160 is implemented by the light source ROM 43, to store various kinds of information and setting used for driving the light source elements 41.

The input acceptance unit 170 is implemented by processing of the control panel 35. The input acceptance unit 170 is configured to display information necessary for the operation to the operator and accept various inputs made by the operator.

Here, descriptions are given below of density unevenness in the main scanning direction in printed images formed by the image forming device 200 and correction of light emission amount of the light source to eliminate or reduce the density unevenness.

If the amount of light emitted from each LED element (i.e., the light source element 41) in an LED head have variations, the density of images formed by an image forming apparatus (e.g., a printer) becomes uneven. Therefore, for example, before the shipment of the image forming apparatus, the amount of light of each LED element is corrected in some cases.

Specifically, before the LED head is mounted on the apparatus, each LED element is sequentially driven, and the light amount of each LED element is detected. Then, for example, a drive current, drive time, or both are adjusted so that each LED element emits a predetermined amount of light, and a correction value of the drive current or drive time is stored in a ROM of the LED head (e.g., the light source ROM 43). When each LED element is driven in a state being mounted in the apparatus, the correction value is read out from the ROM, and the drive current and the like are adjusted based on the correction value, thereby reducing variations in image density. Hereinafter, the correction value based on the result of preliminary measurement of amount of light may be referred to as "initial correction value".

When laser elements are used as the light source elements 41, similarly, the initial correction value can be stored in advance. When laser elements are used, for example, depending on characteristics of the f-θ lens, the amount of light emitted to the photoconductor may be reduced in the end portion in the main scanning direction.

Such reduction of light amount may be addressed by the following method. For example, before shipment of the apparatus or before installation of an optical system in the apparatus, the amount of light of the optical system in the main scanning direction is detected, and adjustment (shading correction) is performed to keep the amount of light reaching the photoconductor constant. The initial correction value, which is the result of such adjustment, is stored in the ROM of the light source unit. When the laser element is driven with the light source unit mounted on the apparatus, adjustment is performed using the initial correction value read out from the ROM.

However, when the light source unit is mounted on an image forming apparatus (e.g., a printer), the above-described adjustment using the initial correction value may be insufficient to eliminate uneven image density. Specifically, in the light source unit being mounted in the apparatus, variations in characteristics and shapes of the respective elements and misalignment between the elements may cause periodic or aperiodic fluctuations in the amount of light emitted. To solve the uneven image density caused by such periodic or aperiodic fluctuations, adjustment merely using the above-described initial correction value may be insufficient.

In view of the foregoing, according to the present embodiment, a predetermined image pattern is printed using an apparatus on which the light source element is mounted, and the printed pattern is read to acquire density data, based on which correction is performed. Hereinafter, the pattern used to acquire the density data may be referred to as "density acquisition pattern". Adjustment based on density data may be referred to as density correction.

With such density correction, density unevenness not solvable with the initial correction value can be alleviated. The density acquisition pattern includes an image density unevenness component caused by a component of the apparatus other than the optical system. Since the unevenness component caused by the component other than the optical system is read in the adjustment, such unevenness component can be adjusted to some extent in the adjustment regarding the optical system.

The adjustment according to the present embodiment further involves determination of whether placement of the recording medium is proper in reading the recording medium on which the density acquisition pattern is printed.

Figure 8:
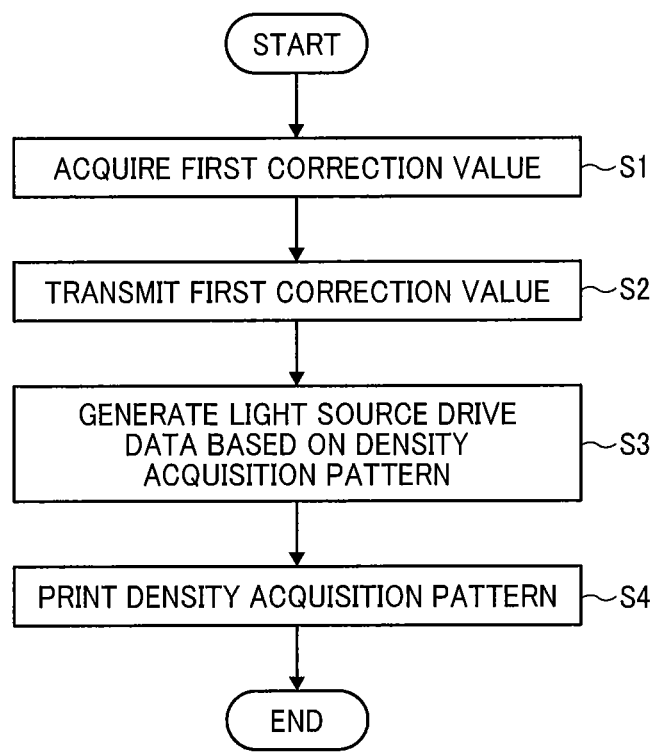
FIG. 8 is a flowchart illustrating a processing flow to print a density acquisition pattern, according to an embodiment.

FIG. 8 is a flowchart illustrating a processing flow to print a density acquisition pattern, according to an embodiment. The correction value storing unit 160 preliminarily stores the correction value with which the amount of light of the light source element 41 is adjusted. The correction value can be empirically obtained. For example, the correction value is stored in the light source ROM 43 by the time of shipping. The correction value can be zero.

The processing flow illustrated in FIG. 8 is executed, in one example, when the operator instructs printing of the density acquisition pattern. Specifically, the operator instructs, via the control panel 35, the image forming apparatus 1 to print the density acquisition pattern. Further, the operator can instruct printing of the density acquisition pattern from a personal computer (PC) being an external device. The density acquisition pattern can be stored in advance in the storing unit 150, for example. When printing of the density acquisition pattern is instructed from an external device such as a PC, the density acquisition pattern can be included in the print instruction.

The correction value acquisition unit 131 acquires a first correction value from the correction value storing unit 160 (S1). In a state immediately after shipment of the image forming apparatus 1, an initial correction value set before shipment is acquired. The correction value transmission unit 132 transmits the acquired first correction value to the driver IC being the driver 42 (S2). The pattern processing unit 133 generates light source drive data based on the density acquisition pattern (S3). The light source drive data includes information and settings required for the driver 42 to drive the light source elements 41. With the controller 130, the drive data (e.g., drive current or drive time) is corrected with the first correction value, and the density acquisition pattern is printed on the recording medium (S4).

Figure 9:
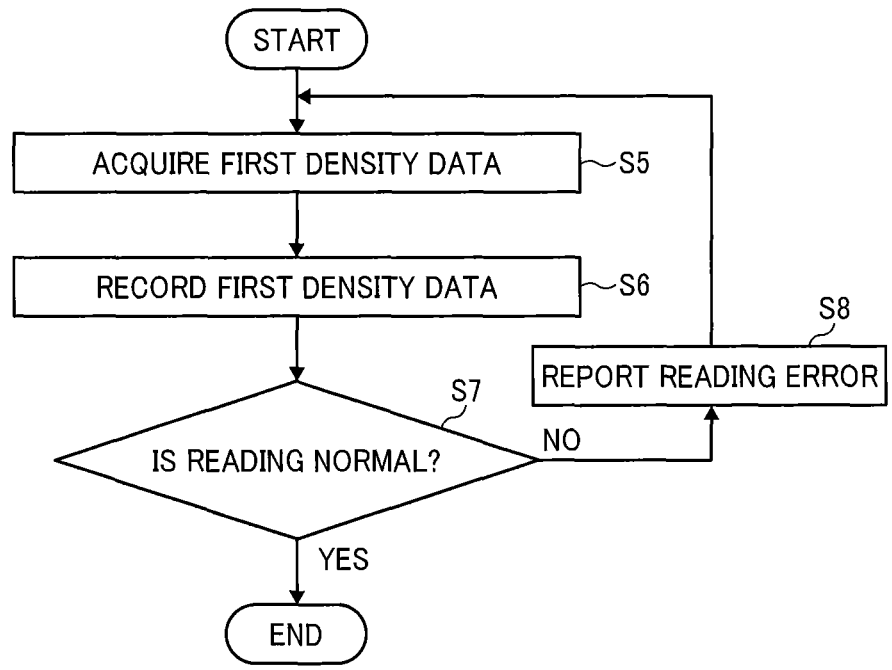
FIG. 9 is a flowchart illustrating a flow of operation to acquire density data from the density acquisition pattern, according to an embodiment.

FIG. 9 is a flowchart illustrating a flow of operation to acquire density data from the density acquisition pattern. First, the operator places the recording medium on which the density acquisition pattern is printed on the exposure glass 11. As the operator instructs from the control panel 35, the image forming apparatus 1 reads the density acquisition pattern. Alternatively, the image forming apparatus 1 can be configured to determine what is read is the density acquisition pattern.

As illustrated in FIG. 9, the image density acquisition unit 135 acquires density data from the scanning of the recording medium placed on the exposure glass 11 (S5). The density data acquired at S5 is hereinafter referred to as first density data. The controller 130 stores the first density data in the storing unit 150 (S6). Then, the controller 130 determines whether or not the density acquisition pattern is read normally, specifically, whether the placement of the recording medium at the time of acquisition of the first density data is correct (S7), When the placement is determined as correct, the flow of operation illustrated in FIG. 9 ends.

By contrast, when the abnormality determiner 134 determines that the placement is incorrect (reading is not normal) at S7, the controller 130 notifies the operator of an error (abnormality) in the reading (S8). As an example of error notification, the controller 130 and the display controller 110 cause the control panel 35 to display a message. The operator notified of the error adjusts the placement of the recording medium, after which the abnormality determiner 134 again determines whether the reading is performed properly (S5). Through the operation illustrated in FIG. 9, the density acquisition pattern data read from the recording medium placed properly is stored in the storing unit 150. The abnormality determination performed at S7 will be described in detail later.

Figure 10:
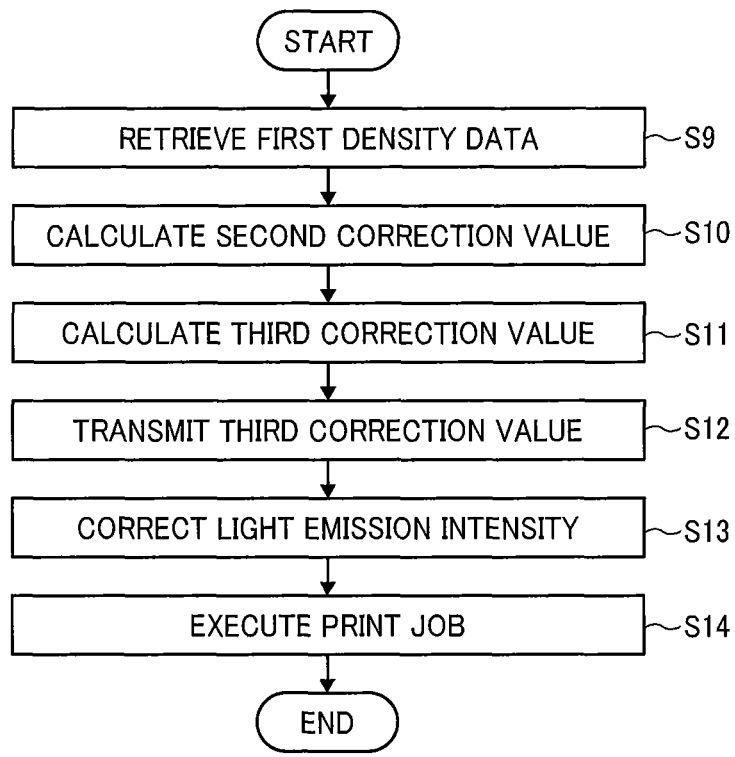
FIG. 10 is a flowchart illustrating an operation flow of image formation based on the density correction according to an embodiment.

FIG. 10 is a flow of image formation based on the density correction. The operation illustrated in FIG. 10 is executed, for example, when the image forming apparatus 1 accepts a print job from an external device or the like. The first calculation unit 136 retrieves the first density data stored in the storing unit 150 (S9). Based on the first density data, the first calculation unit 136 calculates a density correction value, serving as a second correction value, for adjusting the light emission amount of the light source so as not to cause image density unevenness appearing as vertical streaks or the like (S10).

The second calculation unit 137 calculates a third correction value based on the first correction value acquired by the correction value acquisition unit 131 and the second correction value calculated by the first calculation unit 136 (S11). An example of the third correction value is, but not limited to, the sum of the initial correction value (the first correction value) and the density correction value (the second correction value) in an initial density adjustment after shipment.

The correction value transmission unit 132 transmits the third correction value to the driver 42 (S12). Then, the light emission amount of the light source unit 40 is corrected with the third correction value (S13). Then, printing is executed (S14). As a result, the printed image can be free from density unevenness such as vertical stripes. In the subsequent printing, the correction value transmission unit 132 transmits the third correction value to the driver 42 so that an image without density unevenness is obtained without performing the operations illustrated in FIGS. 8, 9, and 10.

In some cases, after the first density data is stored (S6 in FIG. 9), the image forming apparatus 1 is turned off and then turned on again, and printing is performed. In this case, executing the operation illustrated in FIG. 10 in an initial printing after power-on is advantageous in that an image without density unevenness can be obtained irrespective of changes with time of the apparatus or environmental changes. In that case, since the first density data has already been acquired and stored, there is no need to again execute the operation illustrated in FIGS. 8 and 9.

By contrast, in particular, after component replacement or the like of the image forming device 200, executing again the operations illustrated in FIGS. 8, 9, and 10 is advantageous in that an image without density unevenness can be obtained. In this case, the initial correction value is preferably used as the first correction value. For example, it is assumed that the first density data is acquired with the density correction pattern output with the third correction value of that time. In this case, if a characteristic of a replaced component affecting the image density unevenness varies in the opposite directions before and after the replacement, the span of correction increases. Therefore, to reduce the possibility of degradation of correction accuracy, use of the initial correction value is preferred.

There may be cases where correction of density unevenness is unnecessary or the density correction fails to alleviate or worsens the density unevenness. In such a case, the controller 130 can obviate the operation of the second calculation unit 137 so that the driver 42 drives the light source elements 41 with the first correction value. Alternatively, resetting the first density data in the storing unit 150 enables the driver 42 to drive the light source elements 41 with the first correction value.

Figure 11A:
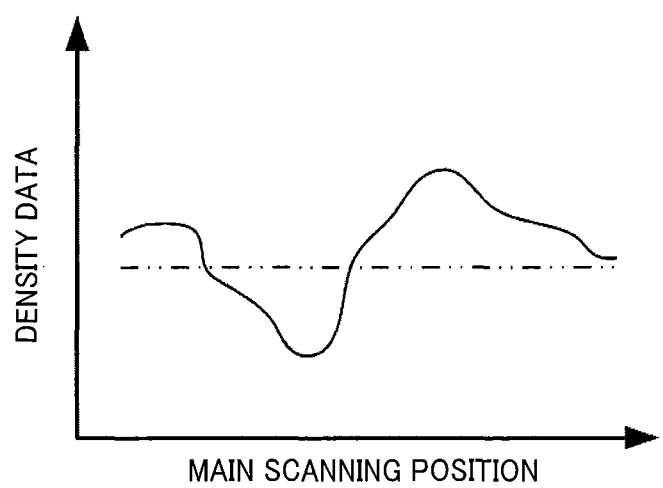
FIGS. 11A and 11B are graphs illustrating image density distributions in a main scanning direction of an output result based on a first correction value of the density acquisition pattern and an output result based on a third correction value according to an embodiment.
Figure 11B:
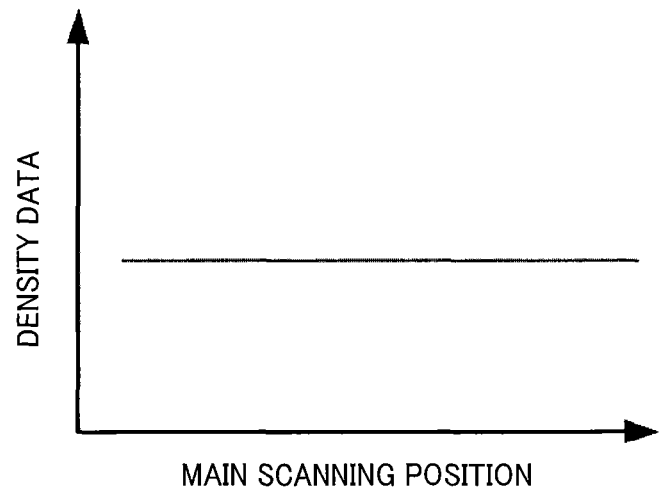

FIGS. 11A and 11B are graphs illustrating image density distributions in the main scanning direction of an output result based on the first correction value of the density acquisition pattern and an output result based on the third correction value. In this example, an LED array is used as the light source. FIG. 11A illustrates the result of printing according to the light source drive data corrected with the first correction value, and FIG. 11B illustrates the result of printing according to the light source drive data corrected with the third correction value.

In FIG. 11A, the solid line indicates the density distribution and the chain double-dashed line indicates the average value of the density data. According to FIG. 11A, when the light source drive data is corrected with the first correction value, the variations in the image density indicated by the solid line from the average value is large. This is because the image density unevenness caused by the light amount variations among the LED elements are not fully eliminated, and, in addition, the image density unevenness caused by the components, such as the photoconductor drum 15 and the transfer belt 17, of the image forming device 200 is not corrected. By contrast, FIG. 11B illustrates the result of density correction corresponding to both the light amount variations among the LED elements and the density unevenness caused by the components of the image forming device 200. Accordingly, a uniform image without density unevenness is obtained.

Figure 12:
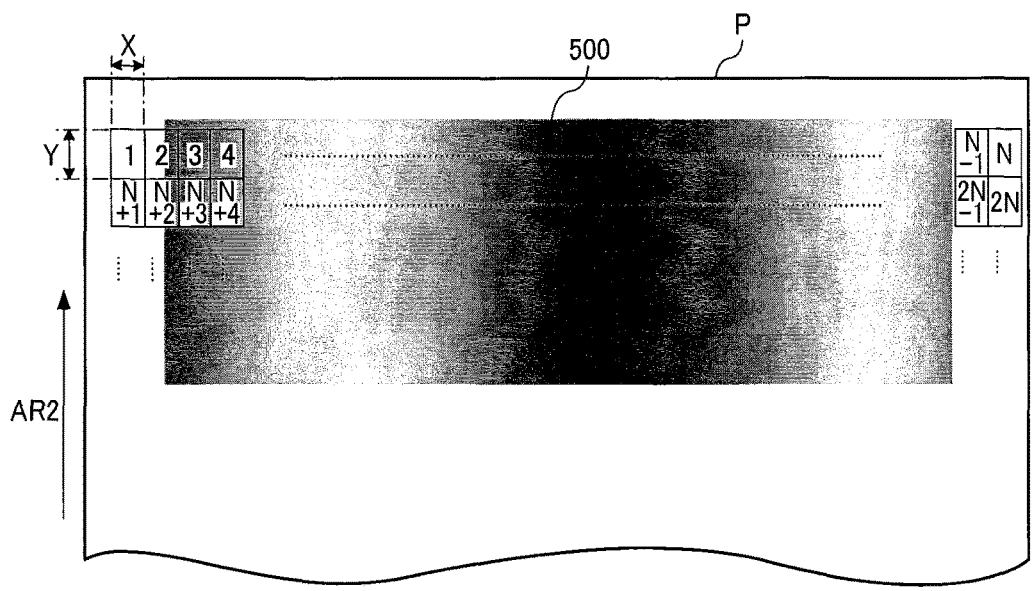
FIG. 12 is a schematic view of a recording medium on which a density acquisition pattern according to an embodiment is printed.

FIG. 12 is a schematic view of a recording medium on which a density acquisition pattern 500 according to an embodiment is printed; The density acquisition pattern 500 includes a continuous area printed in a substantially rectangular area that is shorter in the direction of conveyance of the recording medium P (hereinafter "sheet conveyance direction") identical to the sub-scanning direction (indicated by arrow AR2) and longer in the direction (main scanning direction) orthogonal to the sheet conveyance direction. FIG. 12 illustrates a print result of a halftone image that is uniform in the sub-scanning direction and the main scanning direction, obtained by density correction based on the first correction value. Specifically, FIG. 12 schematically illustrates a case where the optical variations in the main scanning direction of the LED head mounted in the apparatus and image density unevenness, such as the vertical streaks or bands, resulting from variations unique to the components of the image forming device 200 are not corrected in the correction based on the first correction value, resulting in uneven image density of the uniform halftone image.

With reference to FIG. 12, a method of acquiring the first density data will be described. Density data can be acquired in a given width with a minimum resolution being a dot range defined by arrow X in the main scanning direction and arrow Y in the sub scanning direction. The acquired density data is stored, for each range, in the light source ROM 43 (the memory). At the time of reading out, a given area can be designated to be read out, to acquire the density data of the given area.

Figure 13:
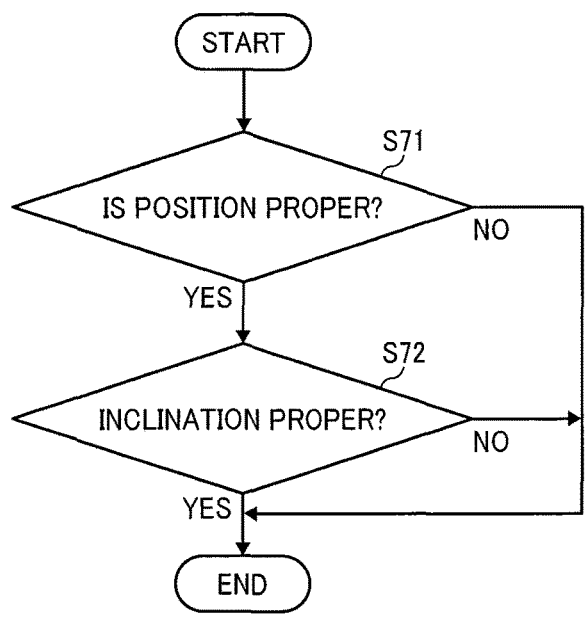
FIG. 13 is a flowchart illustrating a flow of operation to determine abnormality in reading according to an embodiment.

FIG. 13 is a flowchart illustrating a flow of operation to determine abnormality (placement error) in reading. The flowchart illustrated in FIG. 13 is a detailed illustration of S7 illustrated in FIG. 9. The abnormality determiner 134 determines whether the position and orientation of the recording medium P are proper at S71 and determines whether inclination of the recording medium P is proper at S72.

Figure 14:
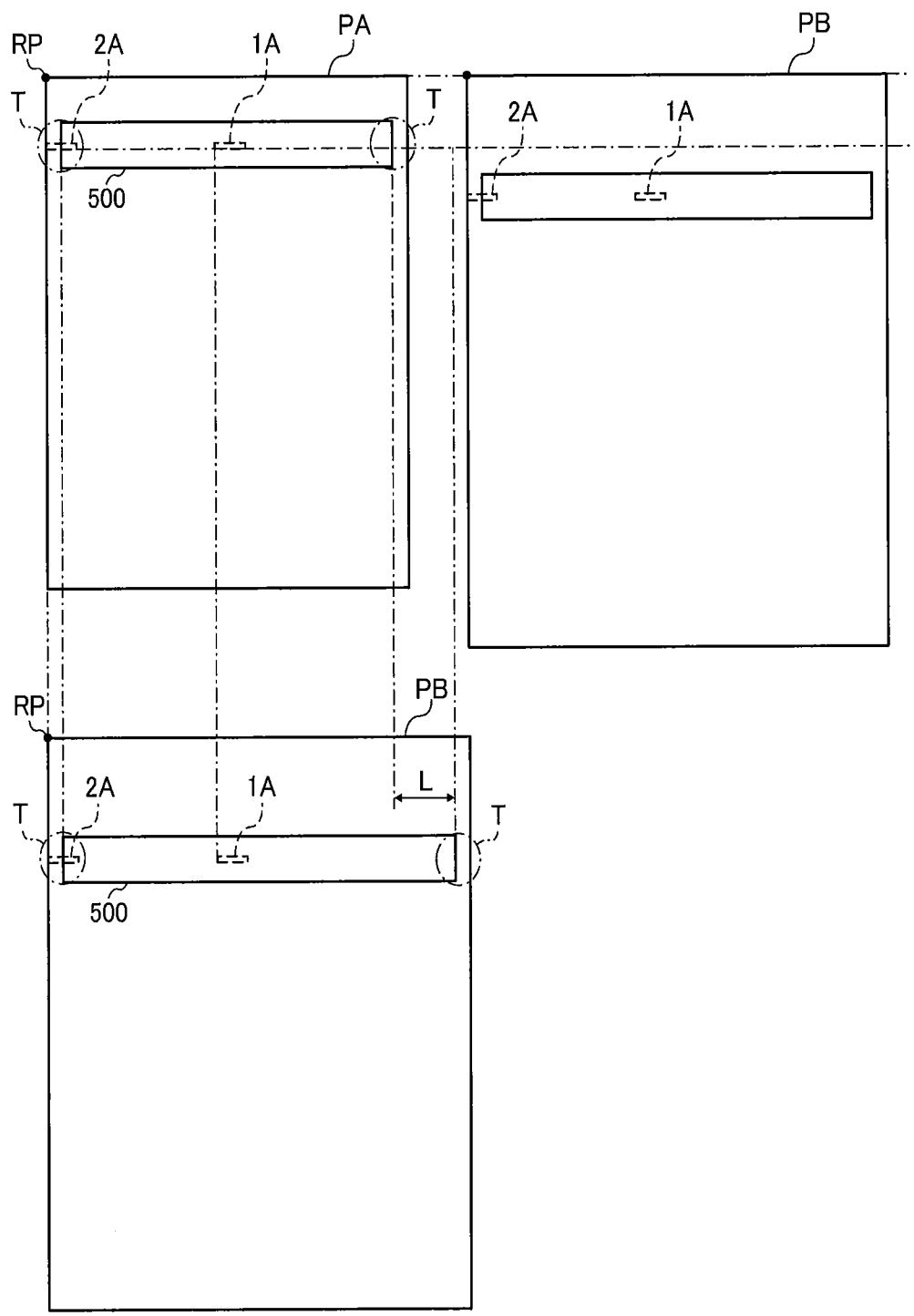
FIG. 14 illustrates an example of a density acquisition pattern formation area and abnormality determination areas (placement error) according to an embodiment.

FIG. 14 illustrates an example of a density acquisition pattern formation area and areas for determining abnormality in reading (placement error).

FIG. 14 illustrates sheets PA and PB, as recording media, different in size. The sheet PB is larger than the sheet PA. On the exposure glass 11, a corner of the sheet PA or PB is aligned with a reference position RP. In FIG. 14, the density acquisition pattern 500 on the sheet PB is longer by a length L in the main scanning direction than the density acquisition pattern 500 on the sheet PA. That is, the width of the density acquisition pattern 500 in the main scanning direction is set according to the sheet size. This is because the density data can be obtained over a wider range irradiated by the light source when the density acquisition pattern 500 is printed longer in the main scanning direction. For example, in the case of an LED array, density data can be acquired for a greater number of light source elements in correcting the density unevenness.

However, blank areas T (sometimes referred to as trim areas or margins) having a constant width are secured at both ends of the sheet in the main scanning direction. If the density acquisition pattern 500 extends to the end of the sheet, the following inconvenience may occur. If the position of the printing is shifted even slightly, the image forming device 200 may be smeared with a portion of toner to be transferred onto the sheet.

Additionally, on both the sheets PA and PB (the recording media), the density acquisition pattern 500 (hereinafter may be simply "pattern") is formed in a region shifted from the center in the sub-scanning direction, and the position varies depending on sheet size. The reason will be described later.

In FIG. 14, each of the sheets PA and PB includes a first area 1A (a pattern presence determination area) and a second area 2A (a pattern absence determination area, collectively "abnormality determination areas") for determining an abnormality or error in placement of the recording medium P, using the density data read from these areas by the scanner 100, of the first density data stored in the storing unit 150.

The description referring to FIG. 14 continues. Here, the reading unit 12 illustrated in FIG. 1 reads the image density of the same area on the exposure glass 11 based on the device configuration of the scanner 100. By contrast, placement of the recording medium (sheet) placed on the exposure glass 11 may be improper with a wrong orientation or an inclination due to an error of the operator, a malfunction of the ADF 13, or the like. FIG. 14 illustrates the positions of the areas for acquiring density data, on the sheet on which the density acquisition pattern 500 is printed, in a case where placement of the sheet on the exposure glass 11 is correct. If the position of the sheet deviates from the position illustrated in FIG. 14, the density data at the position on the sheet shifted from the position illustrated in FIG. 14 is acquired in each area.

That is, when the placement of the sheet on the exposure glass 11 is correct, as illustrated in FIG. 14, density data corresponding to the density acquisition pattern 500 is to be obtained from the first area 1A. Additionally, from the second area 2A, density data including both a value corresponding to the density acquisition pattern 500 and a value corresponding to the blank area T without the density acquisition pattern 500 are to be obtained.

Therefore, when the density data acquired from the first area 1A does not include the value corresponding to the density acquisition pattern 500, presumably, the placement of the recording medium P being read is incorrect. Similarly, when the density data acquired from the second area 2A does not include the value corresponding to the blank area T, presumably, the placement of the recording medium P being read is incorrect.

As described above, the size of the density acquisition pattern 500 varies depending on the sheet (sheet size). Therefore, for example, the controller 130 can be configured to select the abnormality determination areas corresponding to the size of the sheet on which the density acquisition pattern 500 is printed most recently. With such a setting, density correction based on the density acquisition pattern 500 corresponding to a wrong sheet size can be inhibited.

As an example, settings of the abnormality determination areas corresponding to the respective sheet sizes are stored in the storing unit 150. The controller 130 refers to the sheet setting or the like at the time of most recent printing of the density acquisition pattern 500 from the operation logs of the image forming apparatus 1. Then, the controller 130 selects the abnormality determination areas corresponding to the size of the sheet used in the most recent printing of the density acquisition pattern 500.

Figure 15:
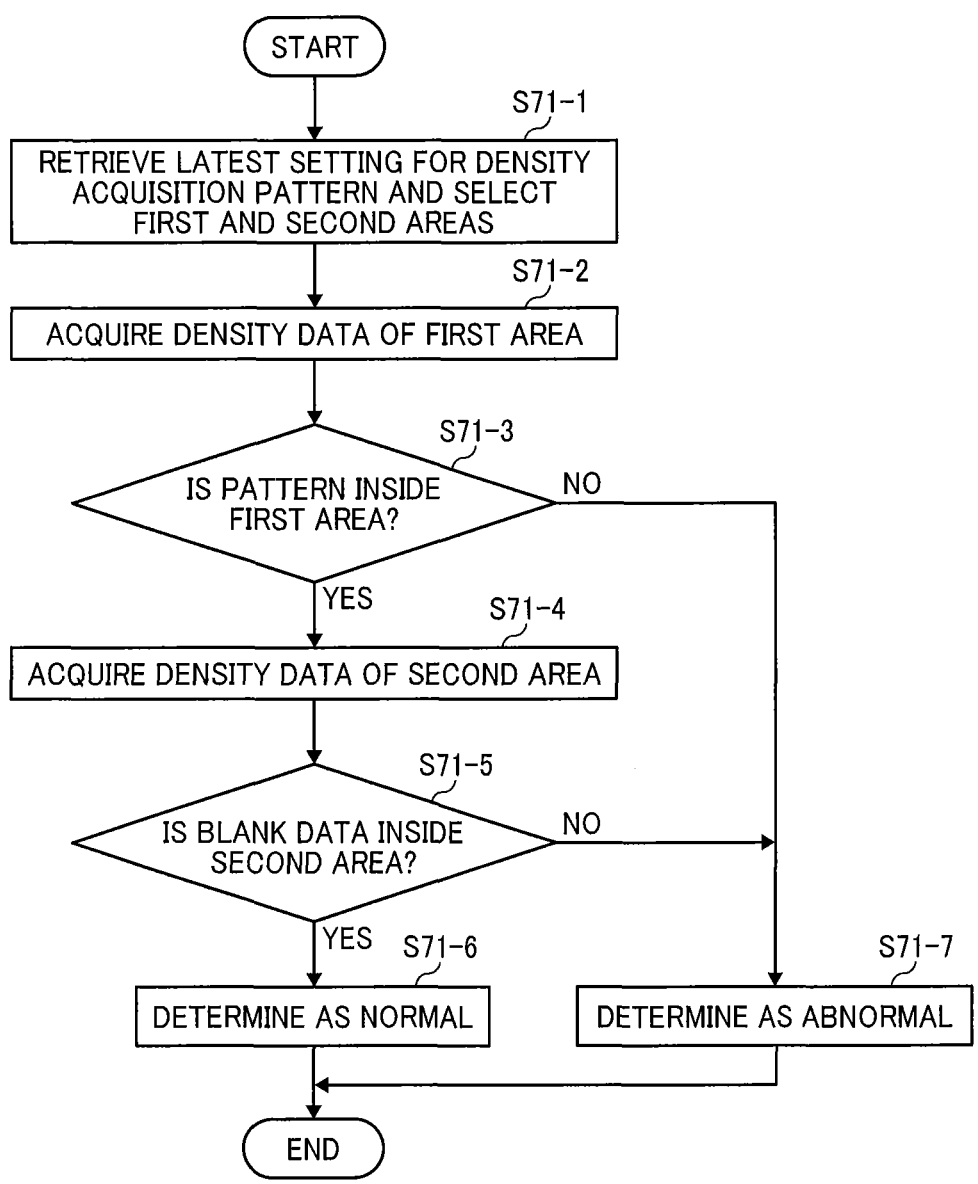
FIG. 15 is a flowchart illustrating an example of detection of incorrect sheet placement according to an embodiment.

FIG. 15 is a flowchart illustrating an example of detection of improper sheet placement according to an embodiment. This flow is mainly executed by the abnormality determiner 134.

First, the reading and writing unit 140 retrieves, from the storing unit 150 or the like, the sheet settings (i.e., latest print setting) used last printing of the density acquisition pattern by the image forming device 200. The first and second areas 1A and 2A are selected corresponding to the sheet type (S71-1).

The density data of the selected first area 1A is acquired (S71-2), and the presence or absence of the pattern is determined from the density data (S71-3). For example, to check the presence or absence of the pattern, a threshold of the density value is set.

When the first area 1A includes the pattern, the abnormality determiner 134 acquires the density data of the second area 2A (S71-4). If the pattern is not in the first area 1A, the abnormality determiner 134 determines that the position or orientation of the recording medium P is improper and sets the detection result to "abnormal" (S71-7).

Following S71-4, the abnormality determiner 134 determines whether the density data of the second area 2A includes the value corresponding to the blank area T (S71-5). If the determination is "Yes", the abnormality determiner 134 sets the detection result to "normal" (S71-6). If not, the detection result is set to "abnormal" (S71-7).

Alternatively, at S71-4, the abnormality determiner 134 can determine whether the density data of the second area 2A includes both the value corresponding to the pattern and the value corresponding to the blank area T. In that case, the abnormality determiner 134 can determine whether the second area 2A corresponds to an end of the density acquisition pattern 500. In addition, the operation flow illustrated in FIG. 15 is not limited to the determination of abnormality in position and orientation, and, according to the operation flow illustrated in FIG. 15, the abnormality determiner 134 can estimate the inclination of the recording medium P, thereby determining the placement error of the recording medium, with the density acquisition pattern 500 and selecting of the first and second areas 1A and 2A.

Figure 16:
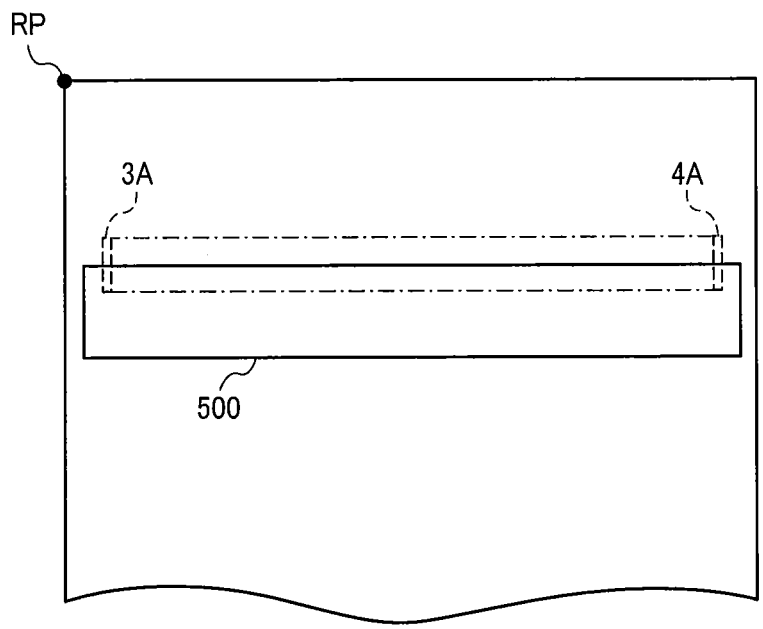
FIG. 16 illustrates another example of the density acquisition pattern formation area and the abnormality determination area.

FIG. 16 illustrates another example of the density acquisition pattern formation area and the abnormality determination areas.

FIG. 16 illustrates a third area 3A (a first boundary area) and a fourth area 4A (second boundary area) for determining abnormality in placement (placement error) of the recording medium, specifically, an inclination of the recording medium.

Both the third area 3A and the fourth area 4A are substantially rectangular and are identical to each other in length in the main scanning direction, position in the sub-scanning direction, and length in the sub-scanning direction. In the sub-scanning direction (vertical direction in FIG. 16), both the third and fourth areas 3A and 4A extend from a region slightly above the upper end of the density acquisition pattern 500, that is, a position free from the density acquisition pattern 500, to a region overlapping the density acquisition pattern 500.

By contrast, in the main scanning direction, the third and fourth areas 3A and 4A are different in position from each other. The third area 3A is closer to one end of the density acquisition pattern 500, whereas the fourth area 4A is closer to the opposite end thereof. The distances from the ends of the density acquisition pattern 500 to the areas are substantially the same.

As described above, since the density acquisition pattern 500 varies depending on the sheet size, the third and fourth areas 3A and 4A are also set according to the sheet size.

Figure 17:
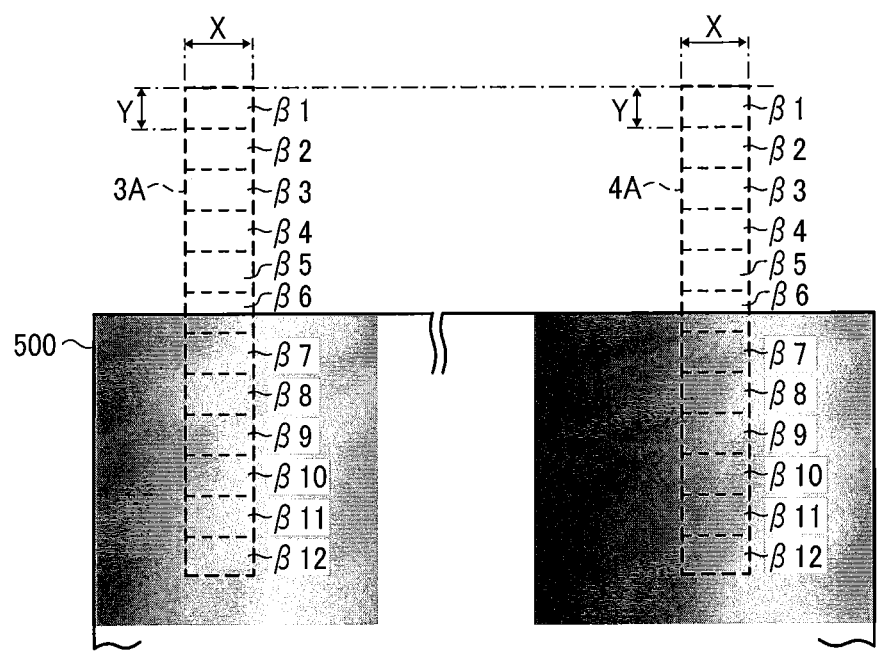
FIG. 17 is an enlarged view of third and fourth abnormality determination areas according to an embodiment.

FIG. 17 is an enlarged view of the third areas 3 and 4 serving as the abnormality determination areas and the surroundings thereof. Each of the third and fourth areas 3A and 4A are divided into blocks $\beta$, which are minimum units for acquiring an image density value in the main scanning direction X and the sub-scanning direction Y. In one example, the divided blocks $\beta$ are numbered from $\beta 1$ to $\beta 1$ to $\beta 2$ in the order from the divided block $\beta$ closest to the reference point in the sub-scanning direction.

Figure 18:
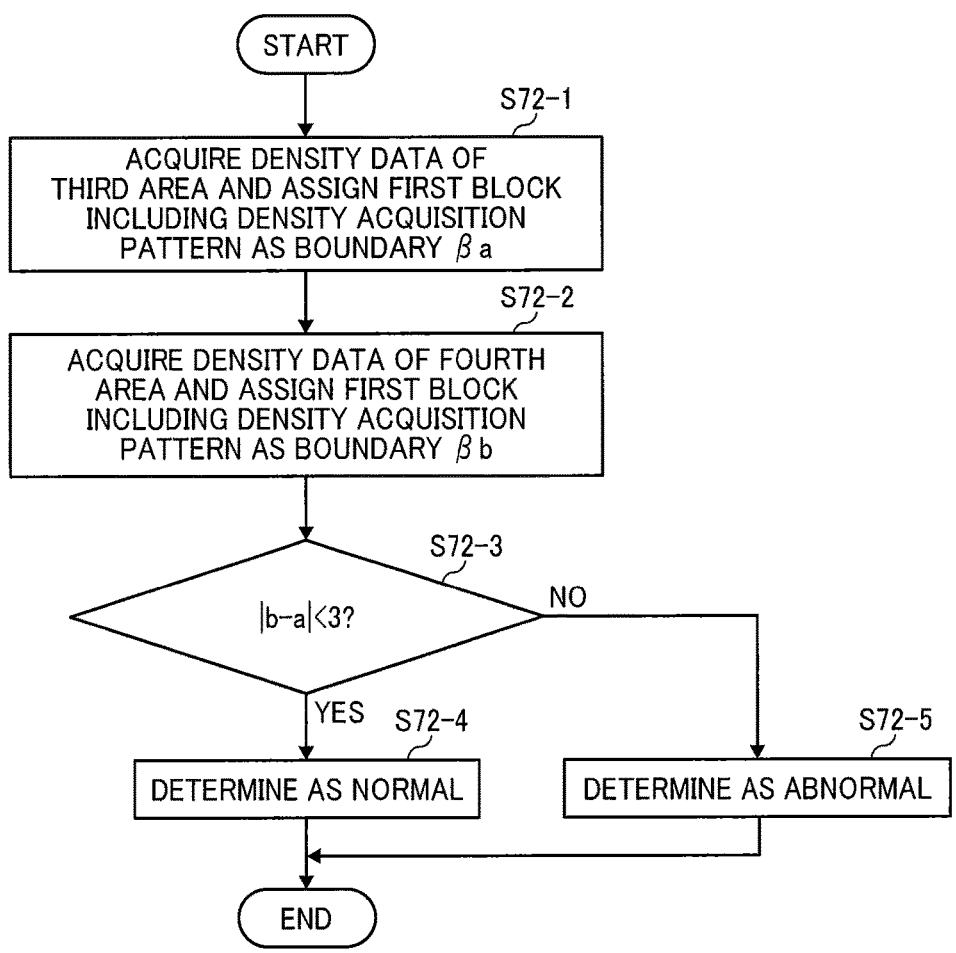
FIG. 18 is a flowchart illustrating another example of detection of incorrect sheet placement according to an embodiment.

FIG. 18 is a flowchart illustrating an example of detection of improper sheet placement according using the abnormality determination areas illustrated in FIG. 17. The flow in FIG. 18 is mainly performed by the abnormality determiner 134 to determine an inclination (wrong orientation) regarding the placement of the recording medium.

The abnormality determiner 134 acquires density data of the blocks $\beta$ in the third area 3A in FIG. 17, sequentially from the block 31, and assigns, as a boundary $\beta a$, the first one of the blocks $\beta$ including the density acquisition pattern 500 (S72-1). Regarding the fourth area 4A, similarly, the first one of the blocks $\beta$ including the density acquisition pattern 500 is assigned as a boundary $\beta b$ (S72-2). The abnormality determiner 134 determines whether the difference between a and b indicating the boundary position between the density acquisition pattern area and the outside thereof is smaller than a threshold, e.g., 3 (S72-3). When the difference between a and b is equal to or greater than the threshold (No at 72-3), the abnormality determiner 134 determines the inclination being abnormal (S72-5). Other than that, the inclination is determined as normal (S72-4).

It is assumed that the third and fourth areas 3A and 4A are selected together with the first and second areas 1A and 2A at S71-1 in FIG. 15 which has been performed earlier. Alternatively, when the operation flow illustrated in FIG. 18 is performed independently of the operation flow illustrated in FIG. 15 or before execution of the operation flow illustrated in FIG. 15, a process corresponding to S71-1 in FIG. 15 is performed before S72-1 in FIG. 18.

With reference to FIGS. 19A to 21B, descriptions are given below of examples of the density acquisition pattern on the recording medium, placement of the recording medium on the exposure glass 11, and determination results in the respective examples. In common among FIGS. 19A to 21B, "sheet PA" and "sheet PB" are different in size, and the sheet PB is larger than the sheet PA.

Figure 19A:
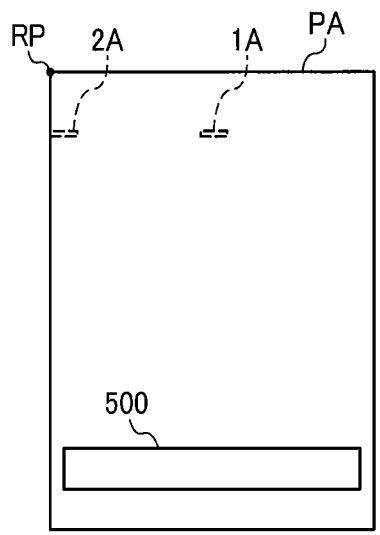
FIGS. 19A and 19B illustrate first explanatory examples of placement of the recording medium and determination results of the placement.
Figure 19B:
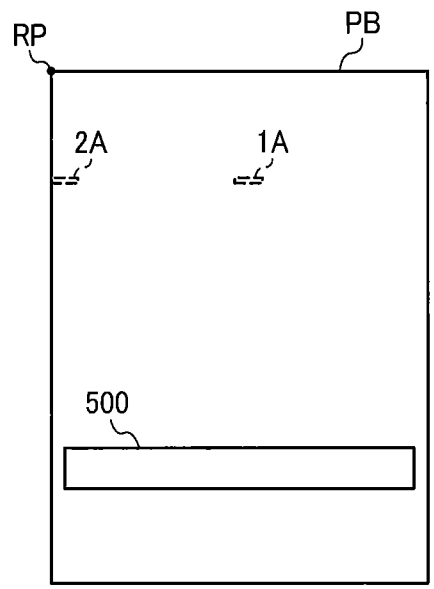

FIGS. 19A and 19B illustrate first explanatory examples of placement of the recording medium and determination results of the placement. Specifically, in this example, the recording medium is placed upside down in the sub-scanning direction.

On each of the sheet PA in FIG. 19A and the sheet PB in FIG. 19B, the density acquisition pattern 500 sized according to the sheet size is printed. The density acquisition pattern 500 on each of the sheets PA and PB is shifted from the center of the sheet PA or PB in the sub-scanning direction (lateral direction in FIGS. 19A and 19B). With such a shifted position, on the sheet PA or PB placed upside down in the sub-scanning direction as illustrated in FIGS. 19A and 19B, the density value of the first area 1A corresponds to the blank area T. Therefore, in both of FIGS. 19A and 19B, the determination result is "abnormal".

Figure 20A:
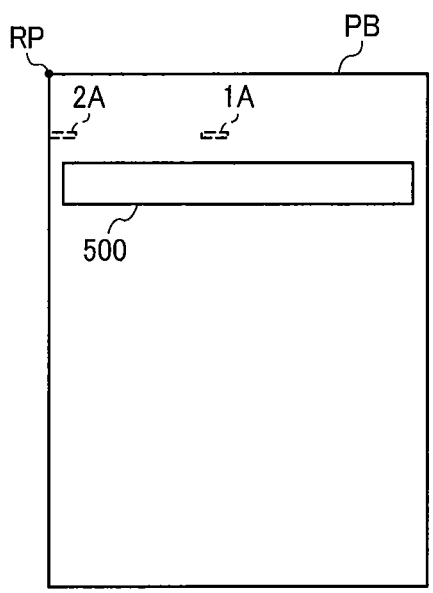
FIGS. 20A and 20B illustrate second explanatory examples of placement of the recording medium and determination results of the placement.
Figure 20B:
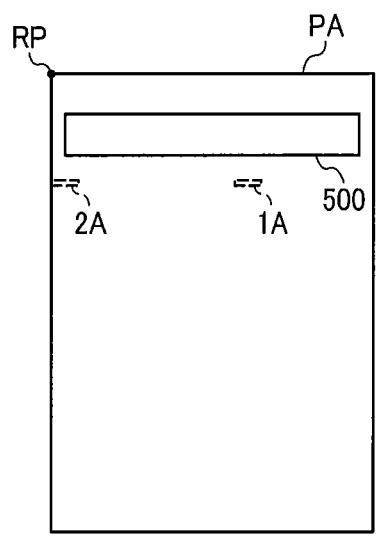

FIGS. 20A and 20B illustrate second explanatory examples of placement of the recording medium and determination results of the placement. As described above, the areas are determined based on the sheet size on which the density acquisition pattern 500 is printed most recently. However, for example, the operator may mistakenly places, not the sheet on which the density acquisition pattern has been printed most recently, but a different size sheet on which the pattern has been printed at another timing, which is the example illustrated in FIGS. 20A and 20B.

FIG. 20A illustrates a case where the density acquisition pattern 500 has been printed on the sheet PB for density correction performed before the density acquisition pattern 500 is printed on the sheet PA, and the sheet PB is mistakenly placed on the exposure glass 11. FIG. 20B illustrates a case where the density acquisition pattern 500 has been printed on the sheet PA for density correction performed before printing on the sheet PB, and the sheet PA is mistakenly placed on the exposure glass 11. In both of FIGS. 20A and 20B, the position of the density acquisition pattern 500 and the position of the abnormality determination areas are different in the sub-scanning direction. Accordingly, the density acquisition pattern 500, which should be present in the first area 1A, is absent in the first area 1A, and the placement is determined as abnormal.

Figure 21A:
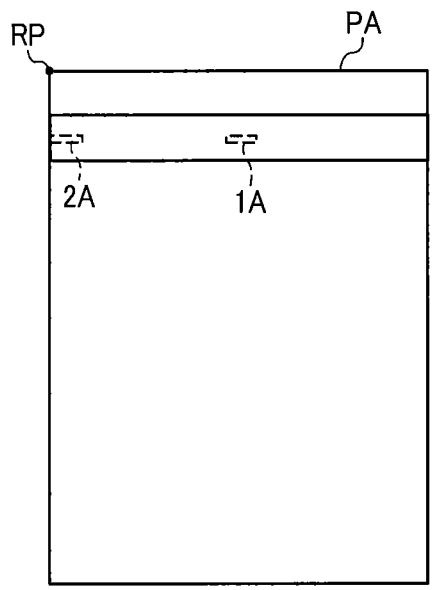
FIGS. 21A and 21B illustrate third explanatory examples of placement of the recording medium and determination results of the placement.
Figure 21B:
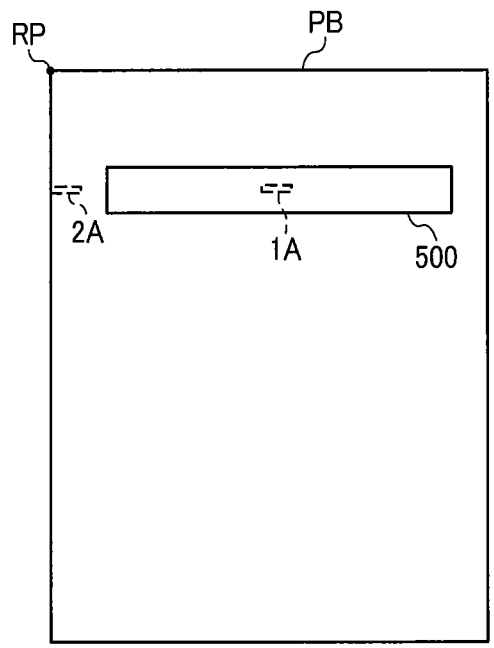

FIGS. 21A and 21B illustrate third explanatory examples of placement of the recording medium and determination results of the placement. In both of FIGS. 21A and 21B, the size of the recording medium on which the density acquisition pattern 500 is printed is wrong. Specifically, in FIG. 21A, the density acquisition pattern 500 to be printed on sheet PB is mistakenly printed on sheet PA, and in FIG. 21A, the density acquisition pattern 500 to be printed on sheet PA is mistakenly printed on sheet PB. For example, such a mismatch occurs when the density acquisition pattern 500 is printed in a state where the settings of the sheet tray does not match the size of the sheets stored in that sheet tray due to a setting mistake or the like made to the image forming apparatus 1. In the case of FIG. 21A, the placement is determined as "abnormal", and, in the case of FIG. 21B, the placement is determined as "normal", which will be described below.

In the example illustrated in FIG. 21A, the density acquisition pattern 500 is printed on a sheet size smaller than the sheet size regarding which the density correction is to be performed. The first area 1A includes the density acquisition pattern 500, but the second area 2A does not include the blank area T. Accordingly, the abnormality determiner 134 determines the placement as "abnormal" based on the determination of the density data corresponding to the second area 2A. Although the first density data is to be acquired for printing on the sheet PB, the sheet PA is smaller than the sheet PB, and both ends of the density acquisition pattern 500 are not printed on the sheet PA. In this example, since the first density data necessary for correcting the density unevenness on the sheet B is not fully acquired, a placement error (or abnormality in reading) should be reported.

By contrast, in the example illustrated in FIG. 21B, the density acquisition pattern 500 is printed on a sheet size larger than the sheet size regarding which the density correction is to be performed. The first area 1A includes the density acquisition pattern 500, and the second area 2A includes the blank area T. Accordingly, the abnormality determiner 134 determines the placement as "normal". In this example, in the main scanning direction, the entire density acquisition pattern 500 is printed on the sheet PB, and the first density data for the density correction can be fully acquired. Accordingly, a placement error (or abnormality in reading) is not reported and acquisition of the first density data is performed.

As described with reference to FIGS. 19A to 21B, the density acquisition pattern 500 and the abnormality determination areas can be set for each of sheet sizes accommodated by the scanner 100 so that the abnormality determination can be made with the sheet size distinguished.

Figure 22A:
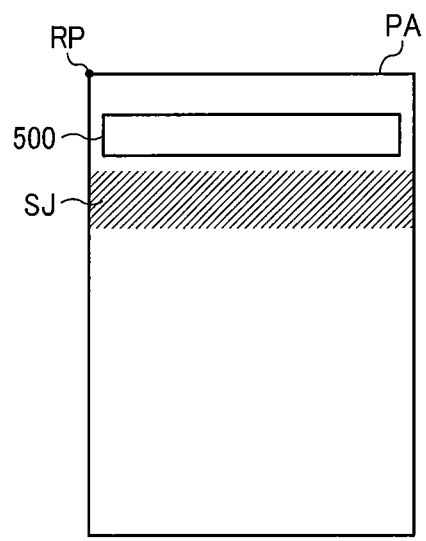
FIGS. 22A and 22B illustrate example density acquisition patterns considering shock jitter.
Figure 22B:
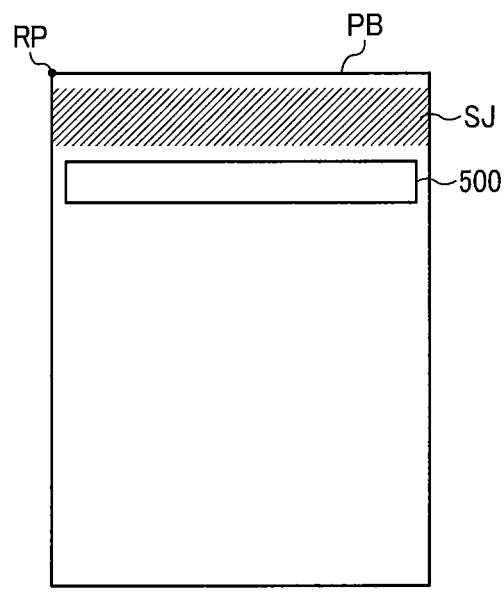

FIGS. 22A and 22B illustrate example density acquisition patterns considering shock jitter. Similar to FIGS. 19A to 21B, "sheet PA" and "sheet PB" are different in size, and the sheet PB is larger than the sheet PA.

Shock jitter is a positional deviation of an image caused by fluctuations in the speed of the transfer belt 17 and the resulting time lag in primary transfer. In a region SJ in FIGS. 22A and 22B, where optical system jitter occurs, there is a possibility of positional deviation of the density acquisition pattern 500, and accurate density data is not acquired.

The position where optical system jitter occurs varies depending on sheet size and sheet thickness. Accordingly, the region SJ where optical system jitter occurs is empirically grasped for each sheet size that may be used in the scanner 100, and the density acquisition pattern 500 can be set at a position avoiding the region SJ.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

What is claimed is:
1. An image forming apparatus comprising:
an image reading device including a reading table, the image reading device to generate image data from reading of a pattern on a recording medium placed on the reading table;
an image forming device including:
a photoconductor;
a charger to charge a surface of the photoconductor;
an exposure device to expose the charged surface of the photoconductor to form an electrostatic latent image on the photoconductor, the exposure device including:
a light-emitting element;

a memory to store a first correction value for correcting a light emission amount of the light-emitting element; and a driver to drive the light-emitting element; and a developing device to supply toner to the electrostatic latent image to form a toner image;

a transfer device to transfer the toner image onto a recording medium; and a fixing device to fix the toner image on the recording medium; and a processor configured to:

cause the image forming device to form a predetermined pattern on the recording medium and cause the image reading device to generate the image data of the predetermined pattern;

calculate a second correction value for correcting the light emission amount, based on density data acquired from the image data of the predetermined pattern;

calculate a third correction value based on the first correction value and the second correction value, the third correction value for correcting the light emission amount; and determine, before calculating the third correction value, whether placement of the recording medium on the reading table is correct based on the density data.

2. The image forming apparatus according to claim 1, wherein the processor is configured not to calculate the third correction value in response to a determination result that the placement of the recording medium is not correct.

3. The image forming apparatus according to claim 1, further comprising a display, wherein the processor is configured to indicate an error on the display in response to a determination result that the placement of the recording medium is not correct.

4. The image forming apparatus according to claim 1, wherein the predetermined pattern includes a continuous region that extends continuously in a main scanning direction at a time of formation of the predetermined pattern.

5. The image forming apparatus according to claim 4, wherein the processor is configured to change a length of the continuous region in the main scanning direction corresponding to a size of the recording medium on which the predetermined pattern is to be formed.

6. The image forming apparatus according to claim 1, wherein the processor is configured to cause the image forming device to form the predetermined pattern at a position shifted from a center in a sub-scanning direction at a time of formation of the predetermined pattern.

7. The image forming apparatus according to claim 1, wherein the processor is configured to set a position of the predetermined pattern avoiding a shock jitter area in formation of the predetermined pattern.

8. The image forming apparatus according to claim 1, wherein the processor is configured to:

set, on the reading table, a pattern presence determination area in which the predetermined pattern is present on the recording medium being placed at a correct position on the reading table;

determine whether the density data corresponding to the pattern presence determination area is smaller than a threshold; and determine that the placement of the recording medium is not correct in response to a determination result that the density data is smaller than the threshold.

9. The image forming apparatus according to claim 1, wherein the processor is configured to:

set, on the reading table, a pattern absence determination area in which the predetermined pattern is not present on the recording medium being placed at a correct position on the reading table;

determine whether the density data corresponding to the pattern absence determination area is greater than a threshold;

and determine that the placement of the recording medium is not correct in response to a determination result that the density data is greater than the threshold.

10. The image forming apparatus according to claim 1, wherein the predetermined pattern is smaller than the recording medium in a main scanning direction and a boundary of the predetermined pattern in the main scanning direction at a time of formation of the predetermined pattern is present on the recording medium, wherein the processor is configured to:

set, on the reading table, a first boundary area and a second boundary area to overlap the boundary of the predetermined pattern on the recording medium being placed at a correct position on the reading table, the second boundary area different from the first boundary area in position in the main scanning direction and similar to the first boundary area in position in a sub-sub-scanning direction;

acquire first boundary density data including density data of a plurality of pixels of the first boundary area;

acquire second boundary density data including density data of a plurality of pixels of the second boundary area;

calculate a density change position representing a pixel at which a density value changes in each of the first boundary density data and the second boundary density data;

compare the density change position in the first boundary density data and the density change position in the second boundary density data; and determine that the placement of the recording medium is not correct in response to a comparison result indicating that a difference between the density change position in the first boundary density data and the density change position in the second boundary density data exceeds a predetermined range.

* * * * *